United States Patent [19]

Pei

[11] 4,419,374
[45] Dec. 6, 1983

[54] METHOD OF BAKING BREAD

[75] Inventor: David C. T. Pei, Ontario, Canada

[73] Assignee: Bettendorf Stanford Inc., Salem, Ill.

[21] Appl. No.: 414,401

[22] Filed: Sep. 2, 1982

[51] Int. Cl.³ .......................................... A21D 8/06
[52] U.S. Cl. ................................. 426/243; 99/339;
219/10.55 R; 219/10.55 M
[58] Field of Search ................ 426/234, 19, 243, 241,
426/242, 496, 505; 219/10.55 R, 10.55 M, 10.55
E; 99/339, 327, 451

[56] References Cited

U.S. PATENT DOCUMENTS

| | | | |
|---|---|---|---|
| 2,942,562 | 6/1960 | Luc | 426/243 |
| 3,107,284 | 10/1963 | Dixon et al. | 219/10.69 |
| 3,220,850 | 11/1965 | Kirk | 426/243 |
| 3,332,370 | 7/1967 | Brastad | 426/243 |
| 3,479,188 | 11/1969 | Thelen | 426/243 |
| 3,881,403 | 5/1975 | Ingram et al. | 219/10.55 A |
| 3,906,115 | 9/1975 | Jeppson | 426/243 |
| 4,271,203 | 6/1981 | Schiffman et al. | 426/241 |
| 4,318,931 | 3/1982 | Schiffman et al. | 426/243 |
| 4,388,335 | 6/1983 | Schiffman et al. | 426/243 |

Primary Examiner—Steven L. Weinstein
Attorney, Agent, or Firm—Polster, Polster and Lucchesi

[57] ABSTRACT

A process of baking proofed loaves of bread in an oven in which a substantially uniform hot air heat in the range of 300° to 500° F. is applied to the loaves constantly throughout the baking process and the loaves are subjected to microwave energy through a portion of the process, the loaves, preferably in mild steel pans, are first exposed to the hot air heat alone for sufficient time to seal the skin of the loaves, generally for about one minute for a one pound loaf of white bread, then exposed to microwave power in the amount of about one half to one and one-half Kilowatts (0.5 to 1.5 KW) per loaf for a period of about one to one and one half minutes, and thereafter, exposed to the hot air alone for a total heating period in the oven of about eight minutes.

5 Claims, 1 Drawing Figure

METHOD OF BAKING BREAD

BACKGROUND OF THE INVENTION

In order to reduce the baking time required for baking bread commercially, it has been proposed to use microwave energy. U.S. Pat. Nos. 3,107,284 and 3,881,403 are typical of early patents directed to ovens for the purpose, and U.S. Pat. Nos. 4,271,203 and 4,318,931 contain excellent discussions of the problems involved, and give solutions to some of them. However, even the methods of the latter patents require a baking time of at least twelve minutes.

It has been found that by applying to baking loaves a massive amount of microwave energy, as compared with the amount used heretofore, for a short time relative to the total baking time after they have been heated conventionally for a similarly short or slightly shorter time, and thereafter heating the loaves conventionally for a somewhat longer time than the combined times of the first two steps, the entire baking time can be reduced to eight minutes for a standard one pound loaf of white bread, the resulting bread having all of the usual desired characteristics.

One of the objects of this invention is to provide a method of baking bread commercially that produces loaves of excellent quality in a shorter time than has been possible heretofore.

Other objects will become apparent to those skilled in the art in the light of the following description and accompanying drawing.

SUMMARY OF THE INVENTION

In accordance with this invention, generally stated, a process of baking and browning bread is provided in which proofed loaves of bread, preferably in mild steel pans, are first exposed to conventional heat for a short time, on the order of one to one and a half minutes for one pound loaves of white bread, are then exposed to radiation at a high power level, on the order of 0.5 to 1.5 KW per loaf for less than two minutes, in the preferred embodiment, about one minute and twenty seconds at 1.5 KW, and are then heated conventionally for less than six minutes, so that the entire baking cycle requires only about eight minutes. In the embodiment shown and described, the loaves are in three pans, side by side, the total microwave energy is on the order of 4.5 to 5 KW for the three one pound loaves of white bread and the loaves are exposed to radiation about eight inches from a rectangular horn of a size and configuration complementary to that of the grouped loaves.

The same principle can be applied to the baking of other farinaceous comestibles, and the term bread is used in the claims to encompass such things as rolls and the like, as well as breads of different description, such as rye or whole wheat.

DESCRIPTION OF THE PREFERRED EMBODIMENT

Figure 1:
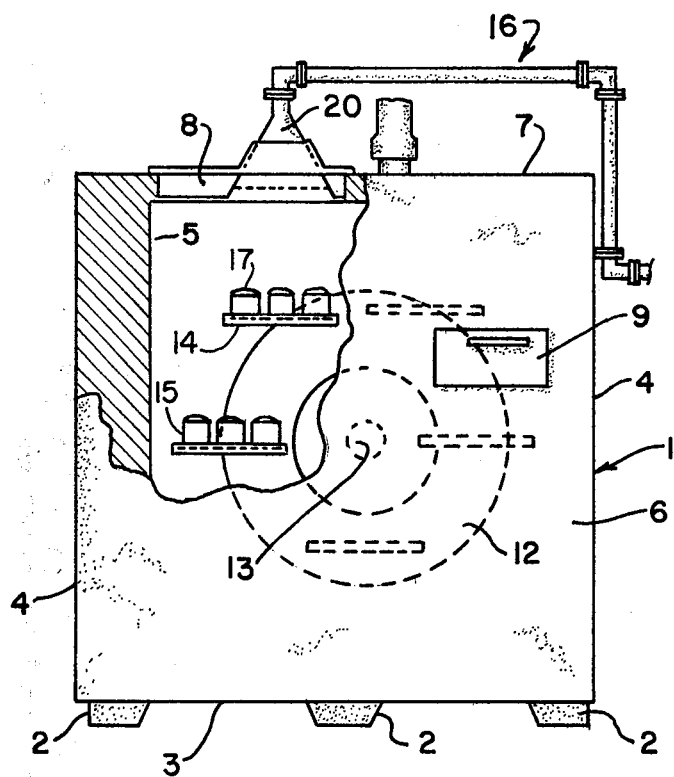
FIG. 1 is a fragmentary, somewhat diagrammatic view in front elevation, partly broken away, of a rotary oven in which loaves of bread are being baked in accordance with the method of this invention.

Referring to the drawing, reference numeral 1 indicates a conventional hot air oven modified for the purpose of this invention. The oven has legs 2, insulated bottom, side, back, front, and top walls 3, 4, 5, 6 and 7, respectively, a door 9 closing an opening in the front wall through which the loaves are loaded and unloaded, and a rotation wheel 12, mounted on a drive shaft 13, and carrying cantilevered trays 14, gravity biased to be self leveling. These elements are all conventional.

For the purposes of this invention, an aperture 8 is provided in the top wall 7, rectangular in shape to accommodate a horn or antenna 20 of a microwave system 16. The horn or antenna 20, shaped and positioned to concentrate its radiation on the loaves immediately beneath it, is operatively connected to a conventional microwave generator, not here shown, capable of delivering 4.5 to 5.0 KW of energy from the horn or antenna 20. Pans 15, in the preferred embodiment, ordinary mild steel bread pans, containing proofed standard one pound loaves 17 are, in the embodiment shown, placed in groups of three on the trays 14. A typical loaf used in verifying the operation of the method of this invention, was made from a batch consisting of hard flour, 57 lb., white sugar, 2 lb., salt, 15 oz., lard, 4 lb. 4 oz., Blend 376 (soya flour, dried whey, skim milk, lacta, albumin and vegetable fat), 3 lb., water, 30 lb., and dry yeast, 10 oz. In this embodiment, the batch was mixed and the loaves were formed and proofed conventionally.

In this illustrative embodiment, the oven 1 is heated to baking temperature, and hot air, at 450° F., is circulated in the oven. The proofed loaves in their pans are placed, in groups of three, on the trays as they are positioned at the opening behind the door 9. As is explained hereinafter, the operation of the rotation wheel in this embodiment is intermittant, stopping periodically for one minute and twenty seconds. The speed of rotation of the wheel 12 and the timing of the loading of the trays are such as to bring the loaves from the opening through which they were loaded to the position shown in the drawing immediately below the horn 20, in about one minute. This has been found long enough to seal the skin and permit good sidewall formation in the baking process, an important element in commercial baking, where the loaves are sliced while still warm. During this time, the loaves are exposed substantially solely to conventional hot air heating. The loaves in the illustrative embodiment are moved to within eight inches of the horn or antenna, which is delivering 4.5 KW of power to the three loaves, or 1.5 KW per loaf, the motion of the rotation wheel is stopped and the loaves remain under the horn for one minute and twenty seconds. The rotation of the wheel resumes, and the loaves are almost immediately screened from the radiation by the next tray's being positioned below the horn. The rest of the travel of the loaves to the oven opening, from which they are removed, requires about five minutes and forty seconds, during which time the loaves brown nicely in response to continued heating by the hot air circulating in the oven. At this time, the internal temperature of the loaves is about 200°. It has been found that by subjecting the loaves to a massive amount of microwave energy as compared with methods suggested heretofore, before a heavy crust has been formed, a tender crust of a desirable thickness is produced, and the process reduces the time required to about eight minutes, for a standard one pound loaf.

A revolving type oven, or conveyor or tunnel type can be used. The loaves can be stopped under the horn or antenna for the desired length of time in any of these types, or the loaves can be moved continuously, particularly in a revolving or tunnel type, where a long horn or a series of horns can be arranged to provide the required energy for the requisite length of time. The power to the horn or antenna can be turned off and on or a radiation shield be interposed to provide the desired period of exposure of the loaves to the microwave energy entirely uniformly, because, as will be appreciated, even though the rotation wheel of the illustrative embodiment moves rapidly between pauses, the first loaf or the first end of the loaves, depending upon their orientation on the tray, will receive more energy than the rest. An example of multiple antennae employed in a tunnel type oven is shown in Dixon et al U.S. Pat. No. 3,107,284. For one pound loaves of white bread, temperatures as low as 300° and as high as 500° F. for the circulating air are considered to be usable, the time of heating before the loaves are exposed to the microwave radiation can be varied from one and one half to one minute, and microwave energies of 0.5 to 5.0 KW can be used, preferably with correspondingly altered exposure times, for example, one and one half minutes at the lower energy and one minute at the higher, for one pound loaves of white bread. It is apparent that larger loaves or smaller loaves or other breads may require different times and amounts of energy. As has been indicated, excellent results have been obtained with the use of mild steel baking pans. Other types of pans may be used, but the conditions may have to be varied to accommodate them. Although in the specific embodiment described, the proofing was done conventionally, microwave energy can be used, the method of proofing itself constituting no part of this invention.

Whatever variations are used or expedients employed, the essential steps in the method of this invention are a short exposure to heating by convection for a time sufficient to seal the skin, followed by a short exposure to microwave radiation at a high power level as compared with levels contemplated heretofore, and thereafter an exposure to heating by convection, with a total baking and browning time on the order of eight minutes for a one pound loaf of white bread.

I claim:

1. In the process of baking proofed loaves of bread in an oven wherein a substantially uniform hot air heat in the range of 300° to 500° F. is applied to said loaves constantly throughout the baking process and the loaves are subjected to microwave energy through a portion of said process, the improvement comprising, relative to a standard one pound loaf, first heating said loaves with said hot air alone for a period of about 1 to 1.5 minutes; second, exposing said loaves to microwave power in the amount of about 0.5 to 1.7 KW per loaf for a period of about 1.0 to 1.5 minutes, and third, exposing said loaves to said hot air substantially alone for a total heating period in said oven of about 8 minutes.

2. The process of claim 1 wherein the loaves are in mild steel baking pans during the entire process.

3. The process of claim 1 wherein the loaves are in constant motion during said process.

4. The process of claim 1 wherein the motion of the loaves is stopped for substantially the duration of the microwave exposure.

5. The process of claim 1 wherein the loaves are spaced an average of about 8" from a horn or antenna radiating on the order of 1.5 KW of microwave energy per loaf.

* * * * *